US 8,046,584 B2
Oct. 25, 2011

(12) United States Patent
Fausse

(54) MESSAGE AUTHENTICATION DEVICE

(75) Inventor: Arnaud Fausse, Paris (FR)

(73) Assignee: Gemalto SA, Meudon Cedex (FR)

( * ) Notice: Subject to any disclaimer, the term of this patent is extended or adjusted under 35 U.S.C. 154(b) by 1539 days.

This patent is subject to a terminal disclaimer.

(21) Appl. No.: 10/706,021

(22) Filed: Nov. 12, 2003

(65) Prior Publication Data

US 2004/0098590 A1     May 20, 2004

Related U.S. Application Data

(63) Continuation of application No. 09/936,645, filed as application No. PCT/FR00/00679 on Mar. 17, 2000, now Pat. No. 7,039,808.

(30) Foreign Application Priority Data

Mar. 17, 1999   (FR) ...................................... 99 03330

(51) Int. Cl.
     *H04L 9/32*         (2006.01)
     *G06F 7/04*         (2006.01)
     *H04N 7/16*        (2011.01)
(52) U.S. Cl. ........ 713/176; 713/170; 713/175; 713/181; 726/10; 726/20; 725/6
(58) Field of Classification Search .................. 713/176, 713/161, 170, 175, 181; 725/6; 726/10, 726/20
See application file for complete search history.

(56) References Cited

U.S. PATENT DOCUMENTS

| | | | | |
|---|---|---|---|---|
| 4,682,285 A * | 7/1987 | Ozil et al. | ....................... | 710/40 |
| 4,839,793 A * | 6/1989 | Brunk | .............................. | 710/36 |
| 4,935,962 A * | 6/1990 | Austin | .......................... | 713/159 |
| 5,237,609 A * | 8/1993 | Kimura | ......................... | 713/193 |
| 5,502,617 A * | 3/1996 | Tsukada et al. | ............... | 361/686 |
| 5,515,440 A * | 5/1996 | Mooney et al. | ............... | 713/159 |
| 5,606,609 A * | 2/1997 | Houser et al. | ................. | 713/179 |
| 5,701,343 A * | 12/1997 | Takashima et al. | ............. | 705/51 |
| 5,818,955 A * | 10/1998 | Smithies et al. | .............. | 382/115 |
| 5,912,974 A * | 6/1999 | Holloway et al. | ............... | 380/51 |
| 6,125,405 A * | 9/2000 | Farges | ............................. | 710/2 |
| 6,463,537 B1 * | 10/2002 | Tello | ............................. | 713/182 |
| 6,510,514 B1 * | 1/2003 | Sedlak | ......................... | 713/159 |
| 6,694,430 B1 * | 2/2004 | Zegelin et al. | ................ | 713/160 |
| 6,769,620 B2 * | 8/2004 | Devaux et al. | ................ | 235/492 |

* cited by examiner

*Primary Examiner* — Mohammad W Reza
(74) *Attorney, Agent, or Firm* — Osha • Liang LLP

(57) ABSTRACT

Method for checking the signature of a message. The message, signature, and a certificate are sent by a signer having a public key to a recipient having a message storage device. The certificate is checked by a protected device connected to the message storage device and a checking result data element is sent for checking to a display device connected to the protected device. When the certificate is verified, a reduction of the message is calculated in the protected device and the message is recopied onto the display device. The signature is decrypted using the public key in the protected device, and the decrypted signature is compared with the reduction carried out. According to the comparison, a message is sent from the protected device to the display device indicating whether the signature conforms or does not conform to the message or to the public key of the signer put forward.

9 Claims, 2 Drawing Sheets

MESSAGE AUTHENTICATION DEVICE

CROSS-REFERENCE TO RELATED APPLICATIONS

This application is a continuation of U.S. patent application Ser. No. 09/936,645 filed on Dec. 19, 2001 now U.S. Pat. No. 7,039,808

The present invention concerns a method for checking the signature of a message.

FIELD OF THE INVENTION

The invention can in particular be advantageously applied in the field of telecommunications via the transmission of messages in the form of electronic files.

BACKGROUND.

The development of telecommunications via the long-distance exchange of electronic files (electronic trade, electronic mail, authentication in electronic format, etc) has resulted in the arrival of cryptographic processing techniques aiming to protect the messages transmitted on electronic communication networks to stop any attempts to frauds to which said messages may be subject.

Amongst the operations for the cryptographic processing of a message, it is possible to cite the encrypting of the entire message. However, this technique remains extremely cumbersome and is often superfluous, at least in situations where the recipient of the message merely wishes to ascertain the identity of the sender and the completeness of the message he receives in uncoded form. Thus, in order to meet these requirements, the concept of the electronic signature has been developed.

The electronic signature is based on the following principles:

The writer of a message who wishes to authenticate its origin, that is sign it, has available a secret number called a private key $Kpr$ intended for writing an electronic signature for said message. Another key, known as a public key $Kpu$, is available to any recipient of a message originating from the same sender so as to be able to check the electronic signature of the received message. Said public key is generally associated with the name of the sender and other data, such as the period of validity of the key, in a protected structure called a certificate. The protecting of the certificate rests on the fact that all the data is itself signed by a "reliable third party" with his private key $Kprtc$ and whose public key $Kputc$ is accessible to all.

The writing of the signature is made in two stages. First of all, the message is reduced, known as "hatched", by means of a sole direction reduction algorithm, such as those known under the names of SHA1 or MD5. Then the reduced message is encrypted by public key algorithm, RSA, ECC for example, with the aid of the private key of the signer. The result of this encrypting constitutes the signature.

The uncoded message, the signature and possibly the certificate containing the public key $Kpu$ are sent to the recipient via the communication network.

The recipient must then check that the signature received fully corresponds to the message and its author. In order to do this, he reduces the message using the sole direction reduction algorithm selected by the signer and decrypts the signature by using the public key $Kpu$ of the signer. The signature is recognised valid if the result of reduction of the message equals the result of decrypting of the signature. The same method can be used to check the data contained in the certificate with the aid of the public key $Kputc$ of the reliable third party who sent it.

It is interesting to note that the electronic signature depends on the contents of the message and the private key of the signer whereas the handwritten signature identifies the author but is independent of the message.

So as to give a legal value to the electronic signature, it is necessary to prove certain facts including:

The signer must have a private key held by nobody else;
The signer needs to be sure of the message he signs;
The recipient needs to be sure that checking of the signature is properly carried out on the received message;
The recipient needs to be certain of the result of checking.

If one of the above conditions is not verified, the signer and/or the recipient can dispute validity of the signature.

Now, most of the cryptographic processing operations of a message, especially the writing of an electronic signature and its checking, are carried out in office computer environments. However, the computers are open systems on which there is no control of security, as the user is free to install any software he chooses. Similarly, for the computers connected to the communication networks, a large number of <<virus>> or undesirable programmes can be introduced without the knowledge of the user.

Thus, it is necessary to consider the environment of the computer as being "uncertain".

The simplest situation to calculate an electronic signature, for example, could consist of using the computer as a device for storing the message and the, keys and as a device for writing the signature. This solution is clearly unacceptable as the keys stored in the computer can be read by a hacker via the communication network and the same hacker could remotely use the computer to calculate a signature on a message the owner of the computer does not wish to sign.

Thus, it is desirable to be able to have available a protected cryptographic processing device which, in the example for writing a signature, would be used to store the private key of the signer and for calculating the signature, the message remaining stored in the storage element constituted, for example, by the computer.

As a protected cryptographic processing device, it is possible to use a microprocessor card, also called a microchip card. As regards the signature of a message, the microchip card offers the following services:

Storing the private key of the signer;
Calculation of reduction of the message;
Encrypting of the reduced message.

A typical example of the architecture of installing this application basically includes a computer to which the microchip is connected by means of a box. From the computer point of view, the operations occur as follows:

Storage of the message in a storage element of the computer;
Editing the message on the computer;
Calculation of the reduced message on the microchip card;
Encrypting of the reduced message by the card after checking the confidential code introduced by the signer by means of the box;
Sending of the message and signature by the card to the computer for communication to the network.

With this system, the singer is sure that nobody other than he can use his private key for signing. This solution is currently used and is sufficient for calculating the signature whose range has no legal value but for protecting a closed set of computers, such as the internal networks of large concerns.

However, it shall be observed that the cryptographic processing system described above does have a certain number of drawbacks:

- The signer is not certain of the message he signs since he is not guaranteed that a virus in the computer has not modified the message before the reduction operation;
- The recipient is not certain that checking has been properly carried out concerning the message received since there is no guarantee that a virus in the computer has not made the message appear correctly on the screen when the signed message is not the one displayed;
- The recipient is not certain of the result of checking since there is no guarantee that a virus in the computer does not reveal any signature as verified when the latter is false.

Also, the technical problem to be resolved by the object of the present invention is to provide a method for checking the signature of a message, the message, signature and a certificate having been sent by a signer possessing a public key to a recipient having a message storage device for putting right the drawbacks of known cryptographic processing systems so as to attain a suitable level of protection to give the message sent an indisputable legal value and enable a recipient to check the identity of the signer and ensure that the latter is unable, to revoke the message he has sent.

SUMMARY

According to the present invention, the solution to the technical problem put forward consists in that the checking method comprises stages by which:

- The message, signature and certificate are loaded from the storage device into a protected device connected to said storage device of the recipient,
- The certificate in the protected device is checked with the aid of a public key of a reliable third party associated with said certificate and at least one item of data of the result of checking is transmitted by a display device connected directly to the protected device,
- The result data is checked on the display device,
- When the certificate is verified, a reduction of the message is calculated in the protected device and the message is recopied onto the display device during the reduction operation,
- The signature with the public key of the signer is decrypted in said protected device,
- The decrypted signature is compared with the reduction carried out, and
- According to the result of this comparison, a message is sent from the protected device to the display device indicating that the signature conforms or does not conform to the message or to the public key of the signer as specified.

Thus, it can be understood that with the checking method of the invention, the recipient of a signed message could be certain that the identity of the signer is authentic and that the message is genuine and could not be cancelled since shown on the display device shall be the checking result data of the certificate, possibly the certificate, the message on which signature checking is carried out and the checking result of the signature without all these elements circulating in the "uncertain" storage device, on a computer for example, likely to encourage attempts of fraud, the display function (printing, display or filing) being a closed environment considered as "certain".

BRIEF DESCRIPTION OF THE DRAWINGS

The following description in relation to the accompanying drawings, given by way of non-restrictive examples, shall reveal more clearly the details of the invention and on how it can be embodied.

DETAILED DESCRIPTION

Figure 1:
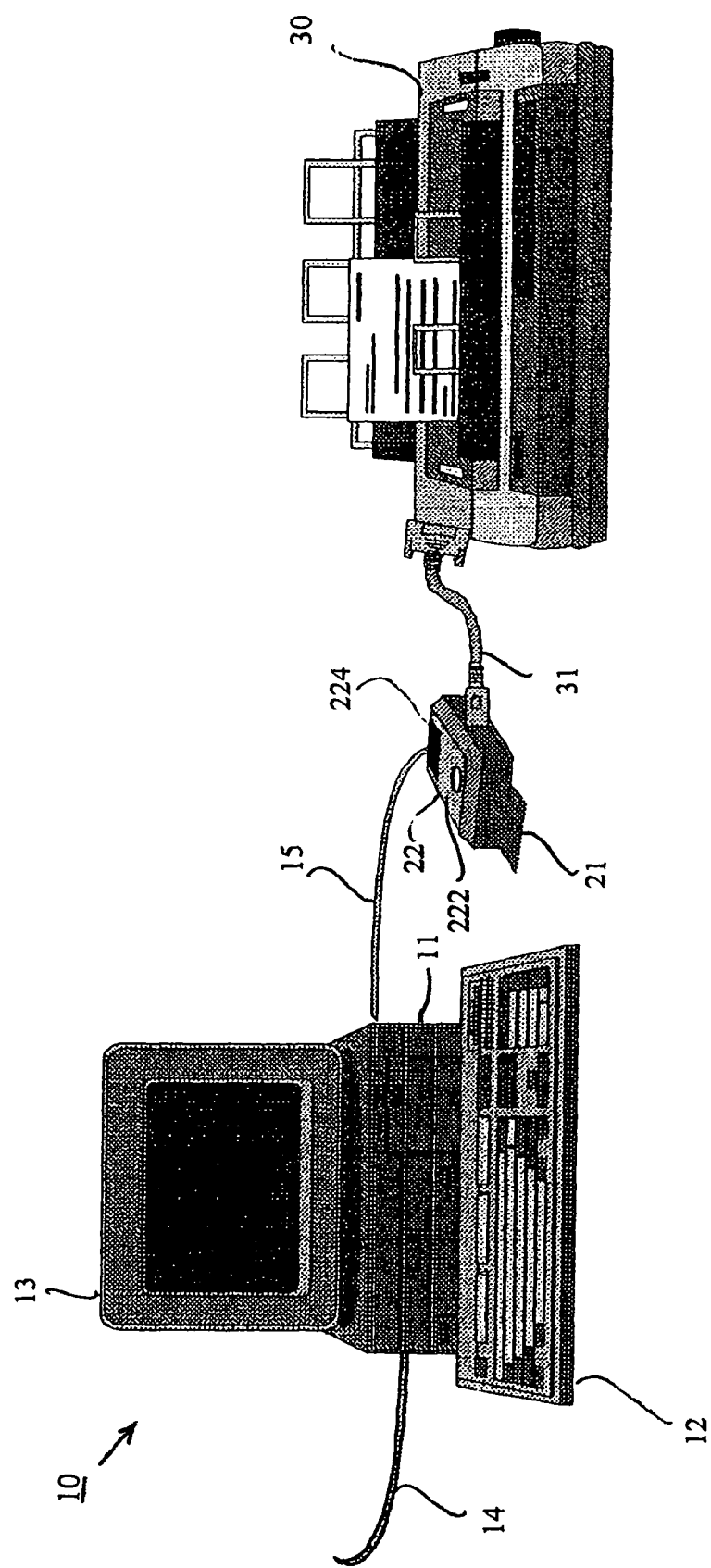
FIG. 1 is a perspective diagram of an authentication device used by a method conforming to the invention.

The authentication device shown on FIG. 1 is intended to authenticate a message during an operation for the cryptographic processing of said message.

In the continuation of the description, two types of cryptographic processing are considered, namely the signature of a message to be sent to a recipient, and conversely the checking by a recipient of the signature of a received message. Of course, other cryptographic processing operations can be implemented with the aid of the authentication device of FIG. 1, such as the encrypting of the message itself.

Generally speaking, the message authentication device of FIG. 1 comprises a device for storing said message constituted for example by a memory in the central unit 11 of a computer 10. In fact, the stored message is the one the author has written using the keyboard 12 and which needs to be covered by an electronic signature. Usually the written message appears on the screen 13 of the computer 10. The central unit 11 communicates with the outside world, especially with the communication networks, with the aid of a cable 14 by which the messages to be signed and sent or the received signed messages are conveyed.

The central unit 11 is connected by a linking cable 15 to a protected cryptographic processing device 21, in this case constituted by a microprocessor card placed in a box 22. As shown on FIG. 2, said box 22 includes an interface circuit 221 called a data/command circuit. The message needing to be signed or the message whose signature needs to be checked, as well as the data required for the checking or signature operations, arrive from the storage device 11 at the microchip card 21 via this circuit by observing, for example, the standard ISO 7816. The data/command circuit 221 has an inlet by activating a button 222 for receiving a signal for triggering the signature operation and the data on a keyboard 224 of the box, such as a confidential code.

Secondly, the microchip card 21 is connected directly to a display device 30, in this case a printer but which could also be a screen or filing device so as to be able to transmit at least the message received from the central unit 11 during the cryptographic processing operation. The link between the microchip card 21 and the printer 30 is embodied by a display interface 223 of the box 22 through which the message and other data needing to be authenticated shall pass.

Figure 2:
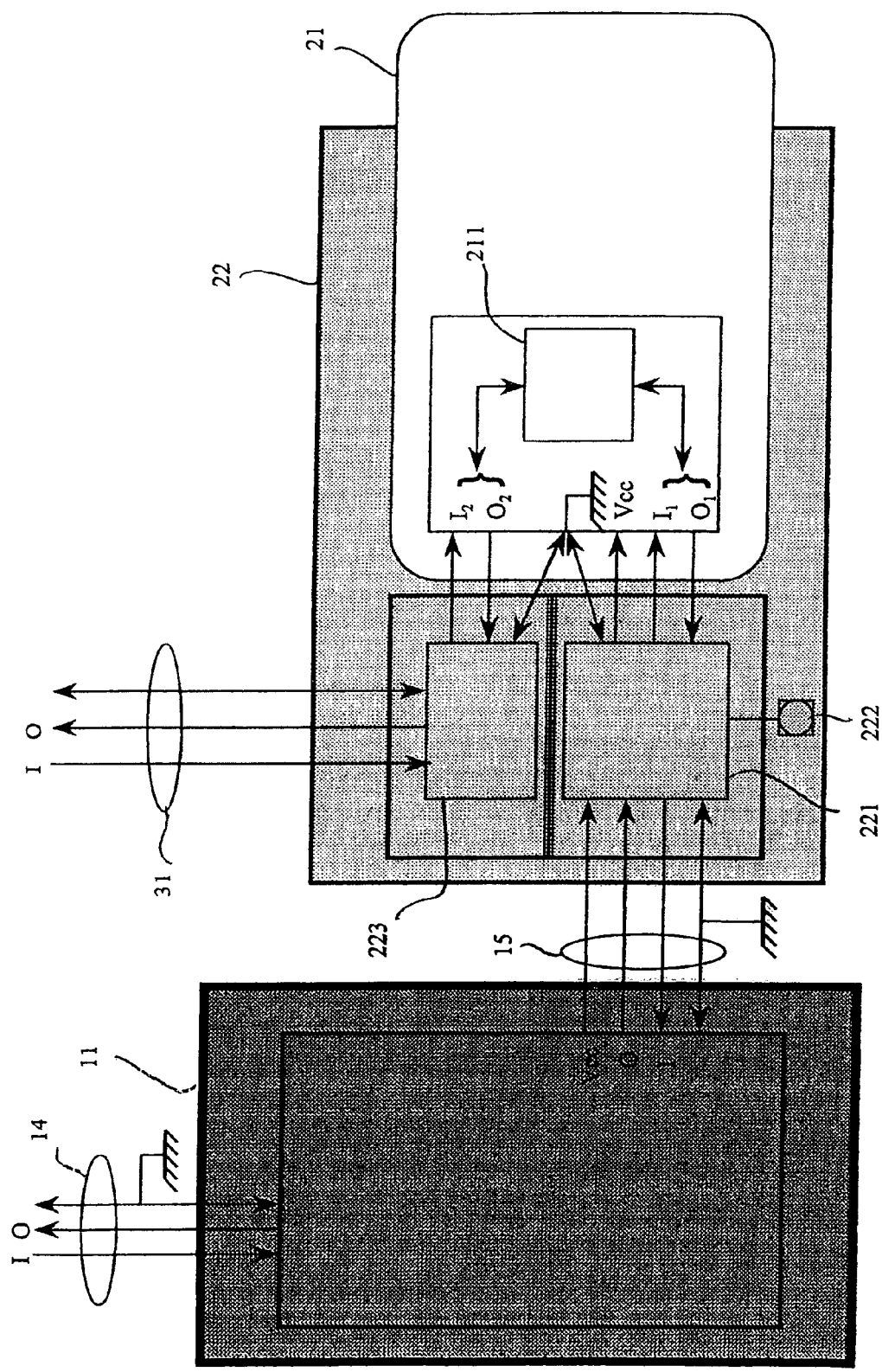
FIG. 2 is a block diagram of the authentication device of FIG. 1.

The architecture of the authentication device shown on FIGS. 1 and 2 is therefore based on a microprocessor card 21 forming the bridge between an "uncertain" zone, the computer 10, and a "certain" zone, the printer 30, the card itself being considered as "extremely certain".

The inlets/outlets of the commands/data 221 and display 223 circuits are electrically independent when no microprocessor card is present in the box 22. When a card 21 is inserted into the box 22, the electric earth is then shared between the two circuits 221 and 223. The data derived from the card 21 towards the display circuit 223 come out via a specific outlet $0_2$ physically distinct from the outlet $0_1$ used for the transfer of commands/data. Similarly, the commands/data and display inlets $I_1$ and $I_2$ of the card 21 are physically separate. In fact, the only logic link between the data circulating in the data/commands 221 and display 223 circuits is the software of the card, considered as "extremely certain".

If the link between the microprocessor card 21 and the printer 30 would not appear to be sufficiently protected owing in particular to its orientation, the card 21 has been designed to be able to transmit to the printer 30 the message to be processed and other data in encrypted form. The mechanism used shall for example be a symmetrical algorithm, such as the triple DES whose key can be fixed or negotiated between the card 21 and the display device 30.

A message signature operation takes place as follows:

1. The message to be signed is edited in the storage device 11 of the computer and subsequently appears on the screen 13 and then the signer asks the computer to start the signature operation.

2. The computer 10 sends the message to the card 21 via the commands/data circuit 221 by packets of N octets so as to be reduced by a chopping algorithm (N=64 if the algorithm SHA1 is used).

3. During initialisation of the chopping algorithm, the software 211 of the card 21 sends an initialisation command from the display device 30 which will make it possible to definitively authenticate the message.

4. During arrival of the message coming from the storage device 11, the software 211 of the card 21 calculates from this on-line reduction and recopies it onto the display outlet $0_2$, so that the display device 30 could display, that is print, the message during the reduction operation.

5. When all the message has been sent to the microprocessor card 21 by the computer and before carrying out the operation for encrypting the reduced message, the card is put on stand-by for receiving a command message.

6. The signer has the time to authenticate the printed message, and then if he accepts its contents, write said command message in the form of a confidential code entered on the keyboard 224 of the box 22. The data/commands circuit 221 generates the command for encrypting the reduced message by displaying the command and the confidential code entered on the keyboard 224 by the signer. The computer cannot see the contents of this command. It is also possible to have available a physically separate inlet on the microprocessor card 21 so as to re-enter the confidential code.

7. The microprocessor card 21 calculates the signature, sends the value to the computer 10 and, if appropriate, to the display device 30. The software 211 of the card 21 could also include other data to be displayed, such as and not exclusively the series number of the card, the name of the signer, etc., if this data is present in the card 21.

It is important to note that the signature operation could only be activated on the card 21 following a reduction and the entering of the confidential code as a command message of encrypting the reduced message. Furthermore, subsequent to signature calculation, signature authorisation is deleted, thus requiring the confidential code to be deliberately entered for any subsequent signature operation.

When this involves an operation for checking the signature of a message, the message and its signature are sent to the recipient into the central unit 11 of his computer 10. The recipient shall then want to check the authenticity of the signature with respect to the message and the signer. This shall occur when the certificate of the signer is also sent to the recipient.

The recipient needs to carry out two types of checking. First of all, checking of the link between the identity of the signer and the public checking key, that is checking of the certificate, and secondly checking of the value of the signature with respect to the message received and the certificate.

The sequence occurs as follows:

1. The recipient triggers the checking operation by loading into the microprocessor card 21 the certificate of the signer and the public key of the reliable third party who has issued the certificate.

2. The computer 10 sends out a command to check the certificate with the public key of the reliable third party. This command triggers initialisation by the card of the display device 30.

3. The card 21 checks the certificate and sends the display device 30 via the display circuit 223 the following data: validity of the certificate (with the dates), public key of the reliable third party used to verify the certificate, public key of the signer, name of the signer and other data able to be linked to the use context. Thus, a recipient receiving a false certificate, digitally genuine but issued by a false reliable third party, would be fully aware of this by comparing the displayed value of the public key of the "false third party" with that of the "genuine third party" whose public key is published in authenticated form. Thus, the recipient can authenticate the identity of the signer and, by means of a date of validity of the certificate, can be certain concerning the date on which a signer signed the message and the non-obsolescence of said certificate. It is also possible to have a data element transmitted to the display device 30, namely a message stating that the certificate is genuine or false. In this case, the recipient merely checks the message and deduces from this that he has received a false or genuine certificate. In a further example, if the certificate is correct, the certificate can be sent to the display device 30 and the recipient then compares the displayed certificate with the certificate sent.

4. When the certificate is checked, the computer 10 triggers the reduction operation command and sends the message to the card 21.

5. When the message coming from the storage device 11 arrives, the software 211 of the card calculates on line its reduction and recopies it onto the display screen $O_2$, so that the display device 30 shall display, that is in this case print, the message during the reduction operation. The recipient is thus able to verify that the calculated reduced message is genuine.

6. When the entire message has been sent to the microprocessor card 21 by the computer 10, the latter then sends a command to verify the signature. It parameterizes the value of the signature received from the signer. The software 211 of the card deciphers the signature with the public key of the signer and compares it with the result of the reduction carried out in stage 5. If there is no equality, the card 21 sends a message to the computer 10 stating that the signature conforms to the message and the public key of the certificate put forward. The card sends to the display circuit 223 the message "Signature OK. End of verification" which can be seen by the checker. If the signature is not correct, the card then sends a message to the computer indicating that the signature does not conform to the message or the public key of the certificate put forward. The card sends the display circuit 223 the message <<Signature incorrect" End of verification able to be seen by the checker>>.

Thus, by means of this method, the signer could find it extremely difficult to revoke a message he has sent.

All these actions shall take place trouble-free in the order indicated. Otherwise, the sequence is annulled by the microprocessor card 21 and it is necessary to start the whole process again.

Of course, the sendings or loadings of the message, the certificate and the signature can be made simultaneously prior to checking of the certificate. Similarly, the sendings of commands for checking of the certificate, and those concerning reduction operations and signature checking can be made by means of a single command. This single command can include the message, the certificate and the signature. As a result, the software of the card identifies this single command and accordingly executes it. Of course, the public key of the signer is also preferably loaded into the microprocessor card 21 during loading of the certificate, unless it is already found in the card.

What is claimed is:

1. An authentication device of a message comprising:
   a message storage device for storing the message, an encrypted signature, and a certificate, wherein the encrypted signature is created using a private key associated with a sender of the message, and wherein the certificate is created using a private key associated with a reliable third party;
   a protected device comprising:
      a microprocessor card; and
      a box configured to receive the microprocessor card; and
   a display device,
   wherein, when the box receives the microprocessor card, the microprocessor card is provided with input/output $I_1/O_1$ of commands/data for a first link with the message storage device and input/output $I_2/O_2$ of display for a second link with the display device, wherein the first link and the second link are physically separate, and
   wherein the microprocessor card is configured to:
      load the message, the encrypted signature, and the certificate from the message storage device onto the microprocessor card;
      obtain result data by verifying the certificate using a public key associated with the reliable third party, wherein the result data is displayed using the display device;
      when the certificate is verified:
         hash the message to obtain a reduction of the message;
         send the reduction of the message to the display device;
         obtain a decrypted signature using the encrypted signature and a public key associated with the sender;
         compare the decrypted signature with the reduction of the message; and
         when the decrypted signature matches the reduction of the message, send a result message to the display device indicating that the signature is valid.

2. The authentication device according to claim 1, wherein a single logic link between the commands/data circulating between the microprocessor card and the message storage device on one hand and data circulating between the microprocessor card and the display device on the other hand is a software of the microprocessor card.

3. The authentication device according to claim 1, wherein the display device is one selected from a group consisting of a printer, a screen, and a filing device.

4. A microprocessor card is configured to be connected to a message storage device and to a display device,
   wherein the microprocessor card is provided with input/output $I_1/O_1$ of commands/data for a first link with the message storage device and input/output $I_2/O_2$ of display for a second link with the display device, wherein the first link and the second link are physically separate, and
   wherein the message storage device is configured to store a message, an encrypted signature, and a certificate, wherein the encrypted signature is created using a private key associated with a sender of the message, and wherein the certificate is created using a private key associated with a reliable third party, and
   wherein the microprocessor card is configured to:
      load the message, the encrypted signature, and the certificate from the message storage device onto the microprocessor card;
      obtain result data by verifying the certificate using a public key associated with the reliable third party, wherein the result data is displayed using the display device;
      when the certificate is verified:
         hash the message to obtain a reduction of the message;
         send the reduction of the message to the display device;
         obtain a decrypted signature using the encrypted signature and a public key associated with the sender;
         compare the decrypted signature with the reduction of the message; and
         when the decrypted signature matches the reduction of the message, send a result message to the display device indicating that the signature is valid.

5. The microprocessor card according to claim 4, wherein a single logic link between the commands/data circulating between the microprocessor card and the message storage device on one hand and data circulating between the microprocessor card and the display device on the other hand, is a software of the microprocessor card.

6. The microprocessor card according to claim 4, wherein the microprocessor card comprises a physically separate inlet to enter a confidential code.

7. A box configured to receive a microprocessor card and further configured to be connected to a message storage device and to a display device,
   wherein the message storage device is configured to store a message, an encrypted signature, and a certificate, wherein the encrypted signature is created using a private key associated with a sender of the message, wherein the certificate is created using a private key associated with a reliable third party,
   wherein, when the box receives the microprocessor card, the microprocessor card is provided with a data/command circuit for a first link with the message storage device and a display circuit for a second link with the display device, wherein an inlet/outlet of the data/command circuit and the display circuit being electrically independent, and
   wherein the microprocessor card is configured to:
      load the message, the encrypted signature, and the certificate from the message storage device onto the microprocessor card;
      obtain result data by verifying the certificate using a public key associated with the reliable third party, wherein the result data is displayed using the display device;
      when the certificate is verified:
         hash the message received to obtain a reduction of the message;

send the reduction of the message to the display device;
obtain a decrypted signature using the encrypted signature and a public key associated with the sender;
compare the decrypted signature with the reduction of the message; and
when the decrypted signature matches the reduction of the message, send a result message to the display device indicating that the signature is valid.

8. The box according to claim 7, wherein a single logic link between the data circulating in the data/commands and display circuits is the software of the microprocessor card.

9. The box according to claim 7, wherein the box comprises a keyboard allowing to enter data, such as a confidential code.

* * * * *